(12) United States Patent
Swinson et al.

(10) Patent No.: US 6,392,691 B1
(45) Date of Patent: May 21, 2002

(54) TELECINE

(75) Inventors: Peter Richard Swinson; Terrence William Mead, both of Hertfordshire (GB)

(73) Assignee: Cintel International Ltd. (GB)

( * ) Notice: Subject to any disclaimer, the term of this patent is extended or adjusted under 35 U.S.C. 154(b) by 0 days.

(21) Appl. No.: 09/524,049

(22) Filed: Mar. 14, 2000

(30) Foreign Application Priority Data

Mar. 16, 1999 (GB) ............................................. 9906024
Apr. 15, 1999 (GB) ............................................. 9908671

(51) Int. Cl.$^7$ ................................................ H04N 3/38
(52) U.S. Cl. ................................ 348/96; 348/96; 348/97
(58) Field of Search ............................. 348/96, 97, 98, 348/99, 100; 358/506

(56) References Cited

U.S. PATENT DOCUMENTS

| | | | |
|---|---|---|---|
| 4,245,253 A | | 1/1981 | Fearnside |
| 5,594,552 A | * | 1/1997 | Fujinami et al. ............ 386/131 |
| 5,644,356 A | * | 7/1997 | Swinson et al. ............. 348/96 |
| 5,982,427 A | * | 11/1999 | Hunt et al. .................. 349/97 |
| 6,118,478 A | * | 9/2000 | Brett ........................... 348/97 |

FOREIGN PATENT DOCUMENTS

| | | | |
|---|---|---|---|
| GB | 2154829 | 9/1985 | |
| GB | 2243264 | * 10/1991 | ............ H04N/3/36 |
| GB | 2322993 | 9/1998 | |

OTHER PUBLICATIONS

U.K. Search Report issued Jan. 21, 2000 in a related application.
Chapter 39 from TV & Video Engineers Reference Book, Edited by K. G. Jackson and G. B. Townsend, Published by Bullerworth–Heimen, 1991.

* cited by examiner

*Primary Examiner*—Andy Rao
(74) *Attorney, Agent, or Firm*—Ostrolenk, Faber, Gerb & Soffen, LLP

(57) ABSTRACT

An apparatus and method for configuring a standard definition raster scanner telecine allows the standard definition telecine to produce an output at a faster than standard definition frame rate, but with a lower than standard definition resolution. This is achieved by configuring the film transport to move film past a light sensor at a multiple of a standard definition frame rate, and scanning the film at the multiple of the standard definition frame rate but with a reduced resolution.

40 Claims, 3 Drawing Sheets

|   |   |
|---|---|
| Film Frame 1<br>Lines 1,5,9... | Film Frame 1<br>Lines 2,6,10... |
| Film Frame 2<br>Lines 1,5,9... | Film Frame 2<br>Lines 2,6,10... |
| Film Frame 3<br>Lines 1,5,9... | Film Frame 3<br>Lines 2,6,10... |
| Film Frame 4<br>Lines 1,5,9... | Film Frame 4<br>Lines 2,6,10... |

Odd Television Field

|   |   |
|---|---|
| Film Frame 1<br>Lines 3,7,11... | Film Frame 1<br>Lines 4,8,12... |
| Film Frame 2<br>Lines 3,7,11... | Film Frame 2<br>Lines 4,8,12... |
| Film Frame 3<br>Lines 3,7,11... | Film Frame 3<br>Lines 4,8,12... |
| Film Frame 4<br>Lines 3,7,11... | Film Frame 4<br>Lines 4,8,12... |

Even Television Field

Figure 2

TELECINE

This invention relates to the scanning of cinematographic film to produce electrical signals corresponding to the images stored on the film. These electrical signals may consist of analogue or digital video signals used to produce television pictures, video recordings or image data files.

Telecine or film scanning equipment used to produce such signals from cinematographic film have been known for many years, and are described for example in "TV and Video Engineers Reference Book" Chapter 39 Butterworth and Heinemann ISBN 0-7506-1021-2. The techniques used to scan film for television applications employ either rastered light systems such as may be produced by a cathode ray tube and scanning system in conjunction with photosensitive detectors, or use a high intensity light source and solid state sensors such as line array or area array charge coupled devices. An example of current telecine equipment using the rastered light principle is the URSA® telecine manufactured by Cintel International Limited of Ware, Hertfordshire, England.

FIG. 1 shows a schematic diagram of the URSA® telecine which is a flying spot scanner. A cathode ray tube (1) produces a raster scan which is imaged onto the film (2) by lens (3), the film is moved past this imaging region at a constant speed by a capstan drive (4) and servo system (5) and the raster is adjusted to follow the film motion. The light passing through the film is modulated by the colour and density of the film at each location or pixel scanned, this light is analysed into it's red green and blue primary colour components using dichroic mirrors (6) and then converted into electrical signals by photomultiplier tubes (7). The three electrical signals are then passed through various processing circuits (8) before being converted into a signal of television format by a frame store system (9). The scanned image may typically be 720 active pixels by 576 active lines this being converted into a standard interlaced television frame with a first field containing all the odd lines and a second field containing all the even lines.

The book "film technology in post production" published by Butterworth-Heinemann ISBN 0-240-51463-7 describes the techniques used in post production of film using telecine equipment, in particular page 30 discusses non-linear editing. A film production which is intended for television use is typically transferred completely from the film negative with full grading and effects applied, and then the editing is done as a video production. This method involves unnecessary telecine time as the production film material is usually much longer than the final selected "takes". An alternative is to use non-linear editing where the production film material is transferred to video cassette ungraded or only roughly graded, this video material is first digitised then edited on the non-linear editing system. The Edit Decision List produced by the non-linear editing is then used by the telecine in a second transfer of the production film where only the required takes are transferred with full grading and effects and at television broadcast quality.

Whilst this latter method takes much less telecine time for the original transfer because minimal grading is needed, it does nevertheless use the telecine facility for a still considerable amount of time, and the telecine cannot be used for higher paying full quality graded work during that time. Further reduction in cost for this type of telecine work may be made by using a lower grade telecine or by scheduling the work outside normal working hours.

We have appreciated that a considerable further saving could be made if faster transfer rates could be achieved.

A proposal to provide faster scanning rates is put forward in GB-A-2,322,993. In this patent application, method of scanning film at a data rate greater than the real time data rate is proposed, using a high definition telecine, and providing an output at real time video data rate. The purpose of this proposed system is to use a high definition telecine to produce standard definition video data more quickly than standard definition video data produced from a standard definition telecine. In this regard, standard definition is defined as 625 picture lines, 576 of which are active with 720 active picture samples on each line at 25 frames per second, for European television, and 525 lines, of which 486 are active, with active 720 picture samples on each line at 30 frames per second for North American television. Whilst this proposal does increase transfer rates, a high definition telecine is required. It should be noted that there are slight variations of what is defined as standard definition. The NTSC RS170A standard is actually 29.94 frames per second, for example, and this and other slight variations are within the scope of standard definition.

We have appreciated that existing owners of standard definition telecines can benefit from faster transfer rates without needing to upgrade to a high definition telecine with the cost that this involves. We have further appreciated that existing standard definition telecines can be improved to provide a faster transfer rate. We have further appreciated that, for editing purposes, a lower than standard definition resolution is acceptable.

Accordingly, there is provided apparatus for configuring a standard definition raster scanner telecine having a film transport, raster scanner and light sensor, comprising means for causing the film transport of a standard definition telecine to move film past the light sensor of the telecine at a multiple of the standard definition rate; means for causing the telecine to scan film at the multiple of the standard definition frame rate but with a reduced resolution; whereby the configuration apparatus can configure a standard definition telecine to scan film at a faster than standard definition frame rate and produce a video data output at standard video data rate comprising video frames of lower than standard definition resolution.

Apparatus embodying the invention thus provides a telecine which may be used to feed a non-linear editing system, operating at a faster than standard definition film frame rate. This higher speed telecine output may be of reduced picture quality because it is used only for edit decision making and would not be incorporated in the final edited production. Standard definition in this document includes the two standards mentioned above, namely 625 picture lines, 576 of which are active with 720 picture samples on each line at 25 frames per second, for European television, and 525 lines, of which 486 are active, with 720 picture samples on each line at 30 frames per second for North American television. The invention is also applicable to any other standard definition telecine without requiring a high definition telecine as discussed above. As previously noted, "standard" definition includes all variants of the adopted universal 525 and 625 line standards within the scope of the term, and is not limited to exactly the line numbers and frame rates above.

The invention is particularly suitable for the aforementioned URSA® telecine. Normal transfers of film take place at 24 or 25 film frames per second, with each frame consisting of 720 pixels by 576 lines of active video data (for the 625 line television system). These numbers are derived from a commonly used specification for the distribution of digital video signals (EBU Tech. 3267 or 3268 and CCIR recommendation 601), a similar specification for 525 line television systems is the ANSI/SMPTE 125M-1995.

In a preferred embodiment, the means for causing the telecine to scan film at the multiple of the standard definition frame rate comprises a controller for controlling the waveform of the scan. This has the advantage that the standard definition telecine is configured without requiring replacement of a large number of component parts. Preferably the controller comprises a look up table for providing scan addresses. This is a relatively straightforward modification to provide the desired scan pattern.

The controller preferably controls the waveform of each line scan and each frame scan to produce two sawtooth waveforms for each line pulse and four sawtooth waveforms for each frame pulse. This has the effect of doubling the line scan rate and quadrupling the frame scan rate without modifying the line and scan pulses.

The preferred embodiment includes means for producing the faster output signal using existing digital video interface standards and requiring a minimum of modification to existing telecine equipment.

The invention also provides a standard definition telecine comprising a film transport, raster scanner and light sensor, and further comprising means for causing the film transport to move film past the light sensor at a multiple of the standard definition frame rate, means for causing the telecine to scan film at the multiple of the standard definition frame rate but with a reduced resolution, whereby the telecine is so configured to scan film at a faster than standard definition frame rate and produce a video data output at standard video data rate comprising video frames of lower than standard definition resolution.

A telecine embodying the invention has the advantages noted above in relation to the configuration apparatus and may also have the preferred features set out above.

The invention also provides a method of scanning film using a standard definition raster scanner telecine, having a film transport, raster scanner and light sensor, comprising transporting film past the light sensor of the telecine at a multiple of the standard definition frame rate, scanning film at the multiple of the standard definition frame rate but with a reduced resolution, whereby the film is scanned at a faster than standard definition frame rate, and producing a video data output at standard video data rate comprising video frames of lower than standard definition resolution.

The preferred method is to cause the telecine to scan the film at a faster frame rate with reduced resolution and to pack several of these reduced resolution images into one frame of a standard digital television interface signal, this interface signal then couples to the non-linear editing equipment where the data would be repacked into a suitable format and stored in memory.

In an embodiment of the invention, the multiple of the standard definition frame rate could conceivably be a non-integer, however, this would cause complexities in subsequent handling of the image data. Accordingly, the multiple of the standard definition frame rate is preferably an integer, in particular the multiple is four.

An embodiment of the invention will now be described, by way of example only, in which:

FIG. 2 is a diagramatic representation of film frames stored in a frame store in accordance with an embodiment of the invention.

Figure 1:
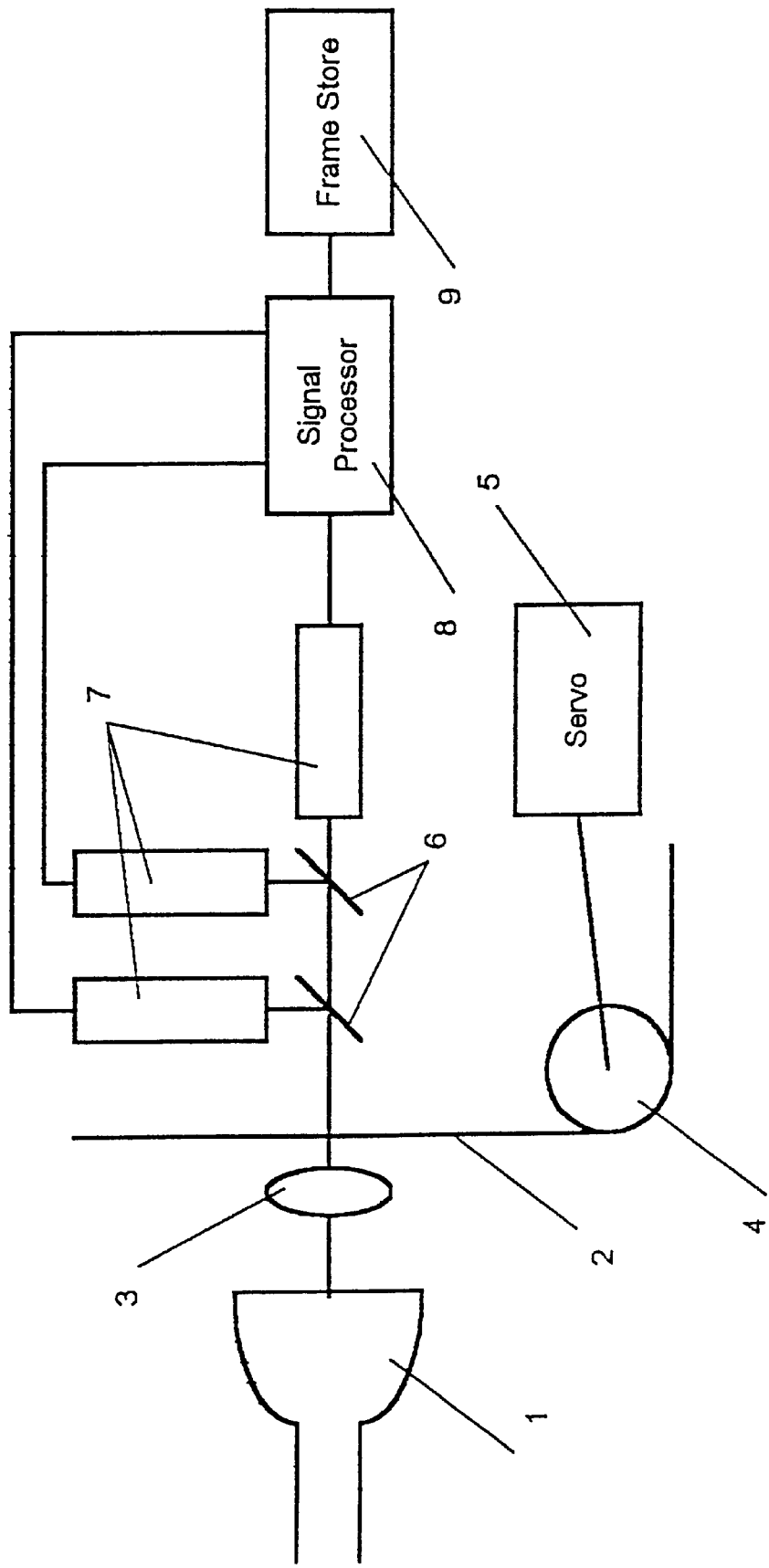
FIG. 1 is a diagramatic representation of a standard definition telecine which may embody the invention.

To aid understanding the embodiments described will consider the particular case of an URSA® telecine, operating at four times normal film speed, and producing a digital video signal corresponding to the aforementioned EBU technical specification 3267 or 3268, although it is clearly possible to apply the technique to other telecine or film scanning equipment and operating at other multiples of speed or television standards. In such alternative embodiments the film scanning equipment is modified in accordance with the invention to scan at a faster than standard rate, but providing a lower than standard resolution.

The film speed in the URSA® telecine is controlled by a servo system which monitors the drive capstan speed by means of a high resolution tachometer, and maintains phase relationship with the scanning by comparison of the servo frame pulse and the film frame pulse derived from a film driven sprocket wheel. To operate at four times the normal film speed requires that the servo aim point be adjusted to four times the tachometer signal frequency, this is an extension of an existing film speed control system. The servo frame pulse has the same repetition rate as the frame pulse supplied to the scanning system.

Two embodiments will be described. In the first embodiment, the scan of a standard definition telecine is modified by increasing the rate of the line and frame pulses and reducing the pixel counts. In the second embodiment, the line and frame pulses are unaltered, but the form of the scan performed is changed. In either embodiment, the result is that film is scanned at a faster than standard definition rate for a standard definition telecine.

The correct scanning format can be produced by halving the number of pixels in each line scan, and halving the number of lines in each frame scan. This is accomplished by halving the pixel and line counts in the scan generator circuits and doubling the repetition rate of the scan line pulses and multiplying the repetition rate of the scan frame pulses by four times. Since the telecine store and it's line and frame pulses are. unchanged the odd lines will occupy only the left hand side of the video data image, the even lines will occupy the right hand side, and since there are only half as many lines in a frame scan the complete film frame image will consume only the top quarter of the video data (quarter of lines at LHS and a quarter of lines at RHS). Four complete reduced resolution film frame images will occupy one frame of video data presented in ascending line sequence with each film frame split into two images side by side (odd numbered lines at the left and even numbered lines at the right). The video data output is further complicated by the conventional technique of interlacing the television lines, i.e. the odd lines of the television frame are presented in a first field followed by the even lines in a second field. The resulting output video data will therefore be as represented by FIG. 2, four frames of film image one below the other on each of two television fields, the first field containing lines 1, 5, 9 etc. at the left and lines 2, 6, 10 etc. at the right, and the second field containing lines 3, 7, 11 etc. at the left and lines 4, 8, 12 etc. at the right.

The faster line and frame scans will result in smaller scan dimensions which means that only part of the film image will be visible, this easily rectified by applying a zoom to increase the size of the scans so as to encompass the whole of the film image. Scan zoom is a standard feature available with the URSA® telecine.

The normal URSA® telecine line scan consists of 720 active pixels and a period of 136 pixels allowed for line scan flyback and video clamping. In the preferred embodiment of this invention the operation is to maintain the same total pixel count of 856 using 136 for each of the two flyback periods which are now required, this leaves 292 active pixels in each line scan. The resulting horizontal resolution is then 292/720 of normal. This arrangement results in an unused blanked period down the centre vertical of the video data. This blanked period could be reduced to provide more active data pixels, however care should be exercised since differences in the scan flyback time between frames would result in small horizontal registration errors between the odd and even lines which would cause blurring or flickering of the image particularly at the start of scans.

The normal URSA® frame scan (for the 625 line television standard) has 576 active lines and 264 unused lines making a total of 840 lines during which one frame of film passes through the film gate. In the preferred s embodiment of this invention the operation is to run the film at 100 frames per second which corresponds to 144 active lines and 210 lines in total for each of the frames. The resulting vertical resolution is ¼ of normal. The unused period of 66 lines or about 3.1 milliseconds is adequate for the scan flyback and other "housekeeping" tasks performed by the telecine.

An important requirement of the system is that each film frame should be individually presented and identified with a film frame number, this allows the non-real time editor to decide the precise frames at which edits should occur, and to pass that information on in the form of an edit decision list to be used by the telecine in the final film transfer. The preceding details are chosen to allow this situation in the case of a film that was shot at 25 frames per second (which is common in films shot for television in 625 line television regions).

In geographical regions that use the 525 line television standard it is usual to shoot film at the cinematography standard of 24 frames per second, and a normal telecine transfer will convert these images to 30 television frames per second. The normal telecine transfer, by means of a controlled frame store, displays the film frames alternately as two television fields and three television fields, there being two television fields per television frame. This irregular presentation of the film frames particularly when combined with the faster film speeds desired would make it quite difficult to identify the data from individual film frames.

The preferred solution to this difficulty is to operate the telecine at 120 frames per second so that each television frame of the output data contains four individual and separate film frames. The previously mentioned standard for the distribution of digital television signals provides for the transmission of additional user information which can in this case be the film frame identification number derived from a telecine time-code or film key-code.

It would be logical to provide the film identification number of the first of the four film frames in each frame of video data, although it would of course be equally valid to refer to any other of the four film frames so long as the standard is known and consistent.

Figure 3:
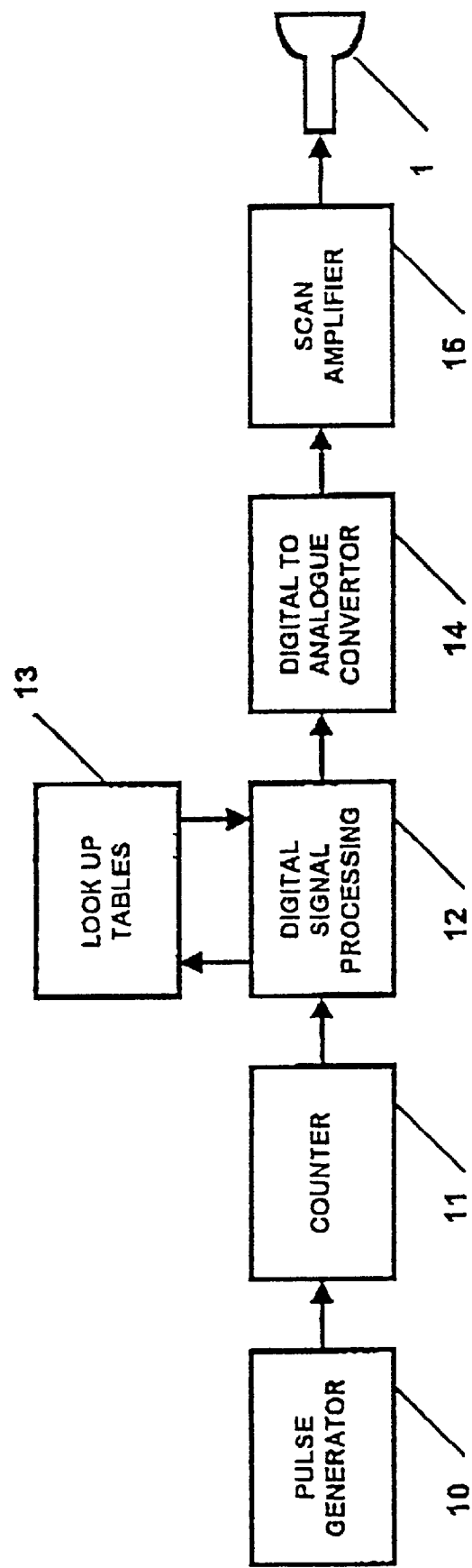
FIG. 3 is a diagramatic representation of scan effects circuitry embodying the invention.

An alternative embodiment of this invention in an URSA® telecine is to make use of the existing scan effects circuitry. The scan effects circuitry allows the operator to implement various changes in the geometry of the scan and hence of the picture produced, the basic nature of these changes is decided by look up tables in the scan circuits and comprises typically perspective, skew, fish-eye lens and other effects. In it's simplest form a look up table converts the basic scan address into an alternative sequence of locations for the spot on the cathode ray tube face. The basic scan effects circuitry is shown in FIG. 3.

In URSA the scans are produced by the following means. A line and frame synchronising pulse is first extracted from the input synchronising signals by pulse generator circuitry 10. These pulses are then used to start the line and frame counters 11 each of which has been programmed with a length (number of pixels or lines) by the software control. The counters then count through their address range under the control of a clock signal which is at pixel rate or a line synchronising pulse.

The addresses produced by these counters are then applied to digital signal processing circuitry 12, which performs the scan effects and scan corrections, and produces the addresses where the spot is required to be at any point in time. These addresses are then converted 14 to an analogue signal and applied to a scan amplifier 15 which drives the CRT 1 deflection coils with the appropriate current. One part of the digital signal processing is a pair of look up tables 13, which have as their input the addresses from the line and frame counters. The content of these look up tables would normally be a linear progression of numbers which if passed directly through the rest of the signal processing would produce a linear current ramp or a constant speed scan across the CRT face.

This invention can be embodied by programming the look up tables as follows. The pixel count table should, instead of the normal single cycle of sawtooth waveform contain two cycles of sawtooth separated by a central flyback and blanking region which is identical to or closely resembles the normal scan waveform between lines. The line count table should, instead of the normal single cycle of sawtooth waveform, contain four cycles of sawtooth. With this arrangement it is not necessary to change the line and frame scan pulses, however four film frames of movement are required for each scan frame, this can be achieved by dividing the film frame pulses by four (using well known digital counting circuitry) to operate the servo system.

The numbers shown above are by way of example, the precise numbers are dependent on the operating speed, the television standard in use, and the build standard of the telecine.

The format of the digital video output signal produced by the above telecine adaptation is in full agreement with the standard digital video interface and can be coupled to the non-real time editor using readily available interfaces. The editor would need to incorporate software to extract the data from each of the four film frames and store this in a fashion suitable for subsequent display and editing. One possible method is to convert each reduced resolution film frame to standard resolution video data by interpolation of the available data. Another method is to store each frame image at the reduced resolution and display at the reduced resolution or interpolate to higher resolution only at the time of display, this method uses much less storage and requires lower data rates during the initial transfer from film. There are clearly other possible methods which can be used.

The embodiment of the invention thus provides the advantage that initial transfer of video signals from the film to a non-linear editing system can be done directly and more quickly than previously possible, with the result that the telecine is free to perform more highly paid full quality transfer work, and that the invention can be simply implemented on existing telecine equipment.

Although it is clearly possible to perform a similar function by operating the telecine scanning at normal resolution but four times speed and extracting the data by omitting some lines and pixels in the telecine store, this method is not preferred due to the higher data rates needed in the telecine resulting in further quality degradation and more complexity in the telecine.

What is claimed is:

1. Apparatus for configuring a standard definition raster scanner telecine, having a film transport, raster scanner and light sensor comprising:
   means for causing the film transport of a standard definition telecine to move film past the light sensor of the telecine at a multiple of the standard definition frame rate;
   means for causing the telecine to scan film at the multiple of the standard definition frame rate but with a reduced resolution;
   whereby the configuration apparatus can configure a standard definition telecine to scan film at a faster than standard definition frame rate and produce a video data output at standard video data rate comprising video frames of lower than standard definition resolution.

2. Apparatus according to claim 1, wherein the means for causing the telecine to scan film at the multiple of the standard definition frame rate comprises a controller for controlling the waveform of the scan.

3. Apparatus according to claim 2, therein the controller comprises a look up table for providing scan addresses.

4. Apparatus according to any one of claim 2 or 3, wherein the controller controls the waveform of each line scan to produce two sawtooth waveforms for each line pulse.

5. Apparatus according to claim 2, wherein the controller controls the waveform of each frame scan to produce four sawtooth waveforms for each frame pulse.

6. Apparatus according to claim 1, wherein the means for causing the film transport to move film past the light sensor at a multiple of the standard definition frame rate comprises a servo controller.

7. Apparatus according to claim 1, wherein the means for causing the telecine to scan film at the multiple of the standard definition frame rate comprises a scan generator circuit for producing line and frame scan pulses at higher than standard definition rates.

8. Apparatus according to claim 7, wherein the line scan pulse rate is twice the standard definition rate.

9. Apparatus according to any one of claim 7 or 8, wherein the frame scan pulse rate is four times the standard definition rate.

10. Apparatus according to claim 1 wherein the multiple is four.

11. A method of configuring a standard definition raster scanner telecine, having a film transport, raster scanner and light sensor comprising:
    arranging the film transport of a standard definition telecine to move film past the light sensor of the telecine at a multiple of the standard definition frame rate;
    arranging the telecine to scan film at the multiple of the standard definition frame rate but with a reduced resolution;
    whereby the telecine is thereby configured to scan film at a faster than standard definition frame rate and produce a video data output at standard video data rate comprising video frames of lower than standard definition resolution.

12. A method according to claim 11, comprising controlling the waveform of the scan further.

13. A method according to claim 12, further comprising providing a look up table for providing scan addresses.

14. A method according to any one of claim 12 or 13, comprising controlling the waveform of each line scan to produce two sawtooth waveforms for each line pulse.

15. A method according to any one of claim 12 or 13, further comprising controlling the waveform of each frame scan to produce four sawtooth waveforms for each frame pulse.

16. A method according to any one of claims 11 to 13 further comprising causing the film transport to move film past the light sensor at a multiple of the standard definition frame rate using a servo controller.

17. A method according to claim 11, further comprising configuring a scan generator circuit for producing line and frame scan pulses at higher than standard definition rates.

18. A method according to claim 17, wherein the line scan pulse rate is twice the standard definition rate.

19. A method according to claim 17 or 18, wherein the frame scan pulse rate is four times the standard definition rate.

20. A method according to any one claims of 11 to 12 wherein the multiple is four.

21. A standard definition telecine comprising a film transport, raster scanner and light sensor, and further comprising:
    means for causing the film transport to move film past the light sensor at a multiple of the standard definition frame rate;
    means for causing the telecine to scan film at the multiple of the standard definition frame rate but with a reduced resolution;
    whereby the telecine is so configured to scan film at a faster than standard definition frame rate and produce a video data output at standard video data rate comprising video frames of lower than standard definition resolution.

22. A standard definition telecine according to claim 21, wherein the means for causing the telecine to scan film at the multiple of the standard definition frame rate comprises a controller for controlling the waveform of the scan.

23. A standard definition telecine according to claim 22, wherein the controller comprises a look up table for providing scan addresses.

24. A standard definition telecine according to claim 22 or 23, wherein the controller controls the waveform of each line scan to produce two sawtooth waveforms for each line pulse.

25. A standard definition telecine according to claim 22, 23 or 24, wherein the controller controls the waveform of each frame scan to produce four sawtooth waveforms for each frame pulse.

26. A standard definition telecine according to any one of claims 21 to 23, wherein the means for causing the film transport to move film past the light sensor at a multiple of the standard definition frame rate comprises a servo controller.

27. A standard definition telecine according to claim 21, wherein the means for causing the telecine to scan film at the multiple of the standard definition on frame rate comprises a scan generator circuit for producing line and frame scan pulses at higher than standard definition rates.

28. A standard definition telecine according to claim 27, wherein the line scan pulse rate is twice the standard definition rate.

29. A standard definition telecine according to claim 27 or 28, wherein the frame scan pulse rate is four times the standard definition rate.

30. A standard definition telecine according to any one of claims 21 to 23, wherein the multiple is four.

31. A method of scanning film using a standard definition raster scanner telecine, having a film transport, raster scanner and light sensor, comprising:
    transporting film past the light sensor of the telecine at a multiple of the standard definition frame rate;
    scanning film at the multiple of the standard definition frame rate but with a reduced resolution whereby the film is scanned at a faster than standard definition frame rate; and producing a video data output at standard video data rate comprising video frames of lower than standard definition resolution.

32. A method according to claim 31, comprising controlling the waveform of the scan.

33. A method according to claim 32, further comprising providing a look up table for providing scan addresses.

34. A method according to claim 32 or 33, further comprising controlling the waveform of each line scan to produce two sawtooth waveforms for each line pulse.

35. A method according to any one of claim 32 or 33, further comprising controlling the waveform of each frame scan to produce four sawtooth waveforms for each frame pulse.

36. A method according to any one of claims 31 to 33 comprising causing the film transport to move film past the light sensor at a multiple of the standard definition frame rate using a servo controller.

37. A method according to claim 31, further comprising configuring a scan generator circuit for producing line and frame scan pulses at higher than standard definition rates.

38. A method according to claim 37, wherein the line scan pulse rate is twice the standard definition rate.

39. A method according to claim 37 or 38, wherein the frame scan pulse rate is four times the standard definition rate.

40. A method according to any one of claims 31 to 33 wherein the multiple is four.

* * * * *